M. Adams,
Seed Planter.

No. 90,911. Patented June 8, 1869.

Witnesses;
John W. Mayhew
F. J. Adams.

Inventor;
Moses Adams

United States Patent Office.

MOSES ADAMS, OF CHILMARK, MASSACHUSETTS.

Letters Patent No. 90,911, dated June 8, 1869.

IMPROVEMENT IN SEED-PLANTER.

The Schedule referred to in these Letters Patent and making part of the same.

*To all whom it may concern:*

Be it known that I, MOSES ADAMS, of Chilmark, in Dukes county, and State of Massachusetts, have invented a new and useful Improvement on the Seed-Planter; and I do hereby declare that the following is a full and exact description thereof, reference being had to the accompanying drawings, and to the letters of reference marked thereon, in which—

Figure 1:
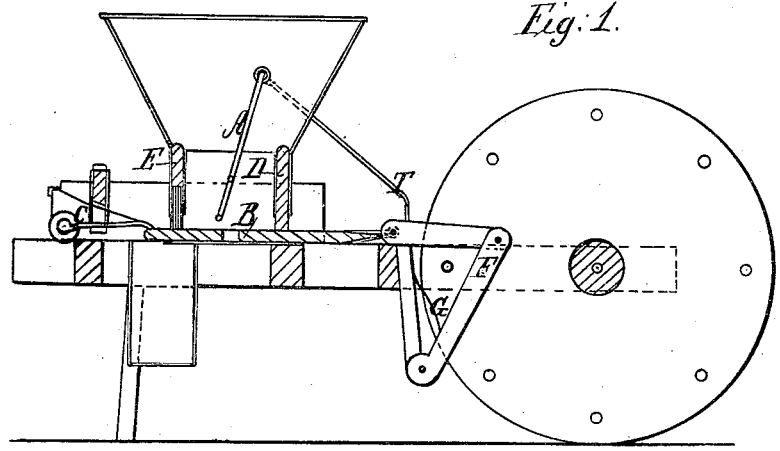
Figure 1 is a sectional view, presenting all the parts.

Letter A, in fig. 1, denotes the crank, which moves oppositely with the seed-slide, marked B, to brush the seed into the hole of said slide.

Letter T is on the driving-rod for the crank.

Letters D and E are on the vertical slides. The latter has a brush attached to it, to allow such seed as may rise in the hole above the level of the slide B, to pass out.

Letter F is on the elbow, or driving-apparatus.

Letter G is on the spring of the same.

Letter C denotes the seed-driver.

Figure 2:
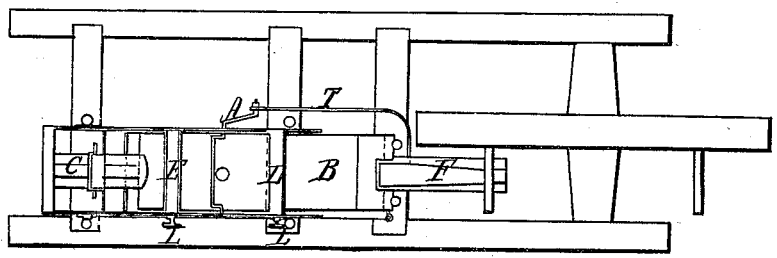
Figure 2 is a plan view, as it appears looking directly down.

Letter L, in fig. 2, denotes the side-screws, to hold the vertical slides D and E down on slide B. The other letters are the same as in fig. 1.

Figure 3:
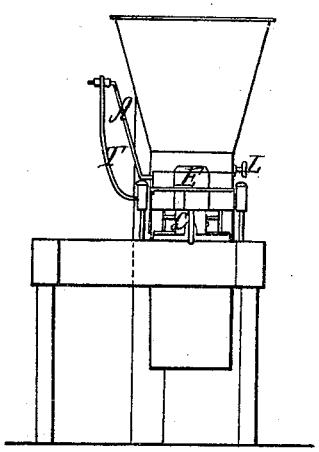
Figure 3 is a plan view of the back part.

The letters in fig. 3 denote the same parts above described.

To enable others skilled in the art to make and use my invention, I will proceed to describe its construction and operation.

I construct my wheel, sixteen inches in diameter, like other wheels, with the addition of a flange on one side, two inches deep, with the rim or tread of the wheel, in which twelve holes are made equidistant apart and from the centre, for screw-pins.

My hopper is made with an opening in front and rear, for the seed-slides, which openings are gauged by two slides marked D and E, which are fastened down to the seed-slides by screws marked L.

The principle upon which the seed-slides are made, is simply to have them a little thicker than the greatest diameter of the seed for which they are intended, and make the hole large enough to hold the number of seed required to be dropped at a time.

The seed-driver, marked C, is made to be raised or lowered, according to the thickness of the seed-slide. It operates by means of the seed-slide striking the wheel. The beak, or part which enters the hole, is made sloping, so that it cannot hold the slide from being drawn forward by the spring.

The hopper is set so that the length of stroke will be just the length of the seed-driver, from the wheel-centre to the beak, and the spring should then be exhausted, so as to dispense with the stoppers in front of the seed-slide, designated by two small circles in fig. 2.

What I claim as my invention, and desire to secure by Letters Patent, is—

1. The ground-wheel, provided with a number of changeable pins, to regulate said distances, in combination with elbow-lever F, spring G, driving-rod T, slide B, operating substantially as set forth.

2. The adjustable seed-driver C, constructed and operating as and for the purpose described.

3. The crank agitator A, and driving-rod T, constructed and operating substantially as set forth.

4. The combination of vertical slides E and D, and screws L L, slide B, seed-driver C, crank-agitator A, driving-rod T, elbow-lever F, spring G, with the pins in the ground-wheel, constructed and operating as and for the purpose set forth.

MOSES ADAMS.

Witnesses:
JOHN W. MAYHEW,
F. J. ADAMS.